(12) United States Patent
Manson et al.

(10) Patent No.: US 9,380,912 B2
(45) Date of Patent: *Jul. 5, 2016

(54) FRYER AND ASSOCIATED HEAT EXCHANGE SYSTEM

(71) Applicant: PREMARK FEG L.L.C., Glenview, IL (US)

(72) Inventors: Richard B. Manson, Baltimore, MD (US); Nigel G. Mills, Kettering, OH (US); Terry R. Wiseman, Baltimore, MD (US)

(73) Assignee: PREMARK FEG LLC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,478

(22) Filed: Apr. 3, 2015

(65) Prior Publication Data

US 2015/0208865 A1 Jul. 30, 2015

Related U.S. Application Data

(63) Continuation of application No. 12/861,346, filed on Aug. 23, 2010, now Pat. No. 9,021,941.

(60) Provisional application No. 61/237,865, filed on Aug. 28, 2009.

(51) Int. Cl.
| | | |
|---|---|---|
| *A47J 27/62* | (2006.01) | |
| *A47J 37/06* | (2006.01) | |
| *A47J 37/12* | (2006.01) | |
| *A47J 36/20* | (2006.01) | |

(52) U.S. Cl.
CPC .......... *A47J 37/1247* (2013.01); *A47J 37/1276* (2013.01); *A47J 36/20* (2013.01); *A47J 37/0611* (2013.01)

(58) Field of Classification Search
CPC ....... A47J 36/20; A47J 27/0813; A47J 27/62; A47J 37/0814; A47J 37/0611; F28F 9/013; F28F 9/0224; F28F 9/0212; F28D 1/05391
USPC ........................... 99/403, 337, 338, 325, 331; 165/172–176
See application file for complete search history.

(56) References Cited

U.S. PATENT DOCUMENTS

| | | |
|---|---|---|
| 1,991,788 A | 2/1935 | Carter |
| 2,053,568 A | 12/1935 | Levin |
| 2,176,869 A | 7/1936 | Childs |

(Continued)

FOREIGN PATENT DOCUMENTS

| | | |
|---|---|---|
| DE | 19747678 A1 | 5/1999 |
| FR | 1220448 | 5/1960 |

(Continued)

OTHER PUBLICATIONS

PCT, International Search Report and Written Opinion, International Application No. PCT/US2010/046413 (Nov. 4, 2010).

*Primary Examiner* — Dana Ross
*Assistant Examiner* — Hemant Mathew
(74) *Attorney, Agent, or Firm* — Thompson Hine LLP

(57) ABSTRACT

A fryer unit includes a vat and heat exchange system with multiple passes within the fryer vat. Additional heat exchange passes may be provided in ductwork along the exterior surface of the lateral vat sidewalls.

11 Claims, 8 Drawing Sheets

(56) References Cited

U.S. PATENT DOCUMENTS

| | | | |
|---|---|---|---|
| 2,452,472 A * | 10/1948 | Keating | A47J 37/1247 126/391.1 |
| 2,655,144 A | 9/1950 | Keating | |
| 3,769,959 A | 11/1973 | Parker | |
| 4,102,330 A * | 7/1978 | Hutchinson | A47J 37/1242 126/374.1 |
| 4,751,915 A * | 6/1988 | Price | A47J 37/1247 126/391.1 |
| 4,848,317 A | 7/1989 | Prudhomme et al. | |
| 4,905,664 A * | 3/1990 | Dunham | A47J 37/1242 126/391.1 |
| 5,101,806 A | 4/1992 | Hunt et al. | |
| 5,417,202 A | 5/1995 | Cote | |
| 5,632,197 A * | 5/1997 | Lubawy | A47J 37/1247 126/391.1 |
| 5,642,742 A * | 7/1997 | Noren | A47L 15/4285 134/105 |
| 5,706,717 A | 1/1998 | Barner | |
| 5,901,641 A * | 5/1999 | McNamara | F28F 13/12 126/391.1 |
| 5,979,548 A * | 11/1999 | Rhodes | B29C 67/0014 137/512.1 |
| 6,016,799 A | 1/2000 | McNamara | |
| 6,095,037 A * | 8/2000 | Savage | A47J 37/1223 210/167.28 |
| 6,196,811 B1 | 3/2001 | Hasse | |
| 6,209,536 B1 | 4/2001 | McNamara | |
| 9,021,941 B2 * | 5/2015 | Manson | A47J 37/1247 99/331 |

FOREIGN PATENT DOCUMENTS

| | | |
|---|---|---|
| GB | 389182 | 3/1933 |
| WO | WO 2005/018391 | 3/2005 |

\* cited by examiner

FRYER AND ASSOCIATED HEAT EXCHANGE SYSTEM

CROSS-REFERENCES

This application is a continuation of U.S. patent application Ser. No. 12/861,346, filed Aug. 23, 2010, which claims the benefit of U.S. provisional application Ser. No. 61/237,865, filed Aug. 28, 2009, both of which are incorporated herein by reference.

TECHNICAL FIELD

The present invention relates generally to deep-fat fryers and, more particularly, to a deep-fat fryer heat exchange system.

BACKGROUND

A typical deep-fat fryer will include a fryer vat containing a heated bath of cooking oil. The cooking oil is adapted to receive baskets of food products such that the food products will be immersed within and cooked by the heated cooking oil. Such fryers include a heat exchanger, which may take the form of in vat heat exchange tubes through which combusted gases pass to deliver heat to the oil through the tube walls.

It would be desirable to provide a fryer and associated heat exchange tube and system that effectively and efficiently heats oil in the fryer vat.

SUMMARY

In one aspect, a fryer vat has a front side, a rear side, a left side and a right side. A heat exchange system is associated with the fryer vat and includes a heat exchange tube arrangement with an associated gaseous fuel burner. The heat exchange tube arrangement includes a first pass within the vat and having an inlet end and an outlet end, the inlet end located toward the front side of the fryer vat, the outlet end located toward the rear side of the fryer vat. A left second pass is within the vat and located between the left side of the fryer vat and the first pass, the left second pass having an inlet end positioned toward the rear side of the fryer vat and an outlet end located toward the front side of the fryer vat, the inlet end of the left second pass connected to receive hot gases from the outlet end of the first pass. A right second pass is within the vat and located between the right side of the fryer vat and the first pass, the right second pass having an inlet end positioned toward the rear side of the fryer vat and an outlet end located toward the front side of the fryer vat, the inlet end of the right second pass connected to receive hot gases from the outlet end of the first pass.

In another aspect, a fryer unit includes a fryer vat having a front side, a rear side, a left side and a right side. A heat exchange system is associated with the fryer vat and including a heat exchange tube arrangement with an associated gaseous fuel burner. The heat exchange tube arrangement includes: first front to rear pass within the vat and having an inlet end and an outlet end, the inlet end located toward the front side of the fryer vat, the outlet end located toward the rear side of the fryer vat; a first rear to front pass within the vat and having an inlet end positioned toward the rear side of the fryer vat and an outlet end located toward the front side of the fryer vat, the inlet end of the first rear to front pass connected to receive hot gases from the outlet end of the first front to rear pass; and a second rear to front pass within the vat and having an inlet end positioned toward the rear side of the fryer vat and an outlet end located toward the front side of the fryer vat, the inlet end of the second rear to front pass connected to receive hot gases from the outlet end of the first front to rear pass. The heat exchange system further includes: a left rear to front duct pass and a left front to rear duct pass located alongside an exterior surface of the left side of the fryer vat, the left rear to front duct pass and left front to rear duct pass located downstream of the first rear to front pass; and a right rear to front duct pass and a right front to rear duct pass located alongside an exterior surface of the right side of the fryer vat, the right rear to front duct pass and right front to rear duct pass located downstream of the second rear to front pass.

In a further aspect, a fryer heat exchange tube arrangement includes a first pass having an inlet end and an outlet end; a left second pass having an inlet end positioned toward the outlet end of the first pass and an outlet end located toward the inlet end of the first pass, the inlet end of the left second pass connected to receive hot gases from the outlet end of the first pass; a right second pass having an inlet end positioned toward the outlet end of the first pass and an outlet end located toward the inlet end of the first pass, the inlet end of the right second pass connected to receive hot gases from the outlet end of the first pass; a left third pass having an inlet end positioned toward the outlet end of the left second pass and an outlet end positioned toward the inlet end of the left second pass, the inlet end of the left third pass connected to receive hot gases from the outlet end of the left second pass, the left third pass positioned below the left second pass; and a right third pass having an inlet end positioned toward the outlet end of the right second pass and an outlet end positioned toward the inlet end of the right second pass, the inlet end of the right third pass connected to receive hot gases from the outlet end of the right second pass, the right third pass positioned below the right second pass.

DETAILED DESCRIPTION

Figure 1:
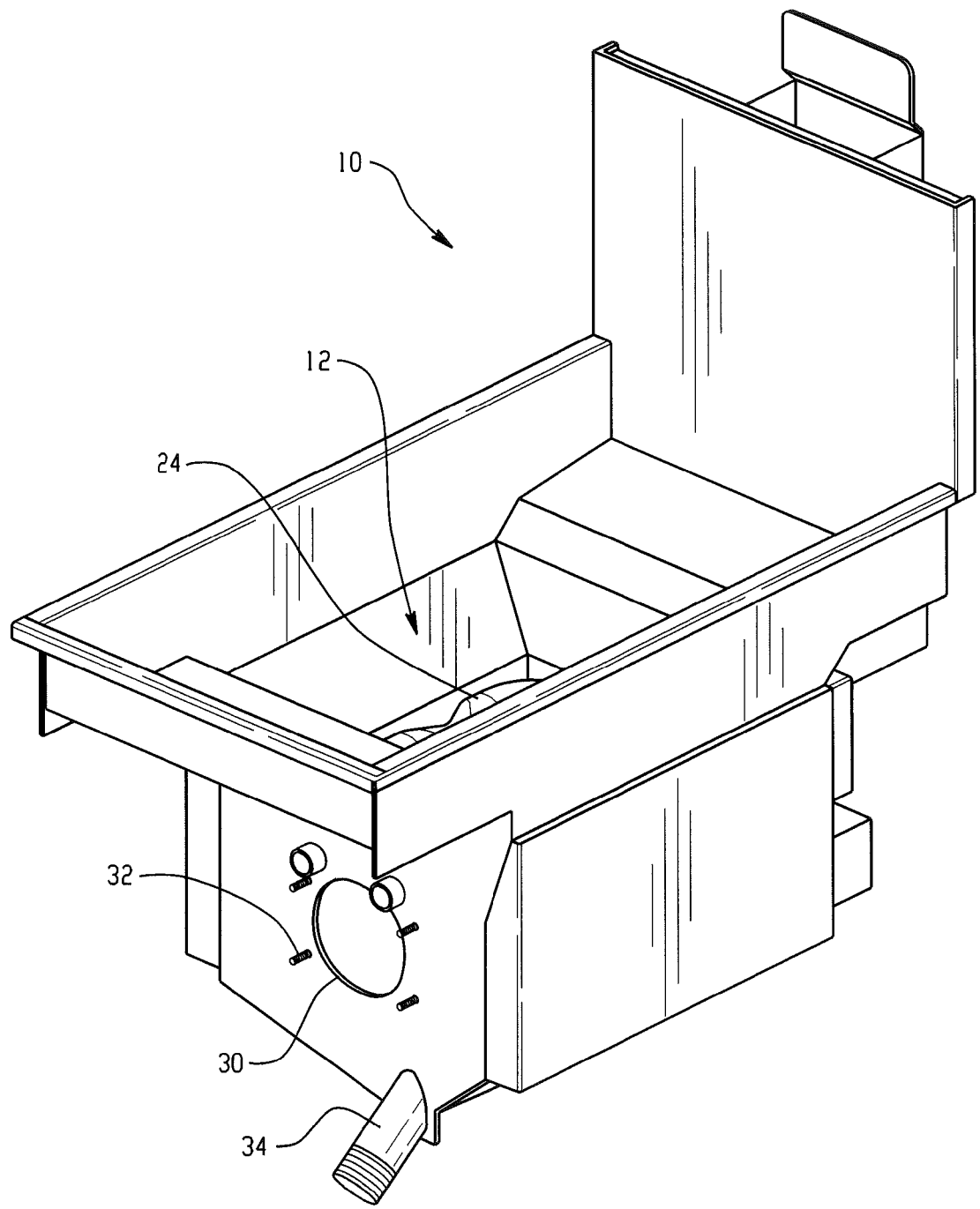
FIG. 1 is a perspective view of a fryer apparatus.
Figure 2:
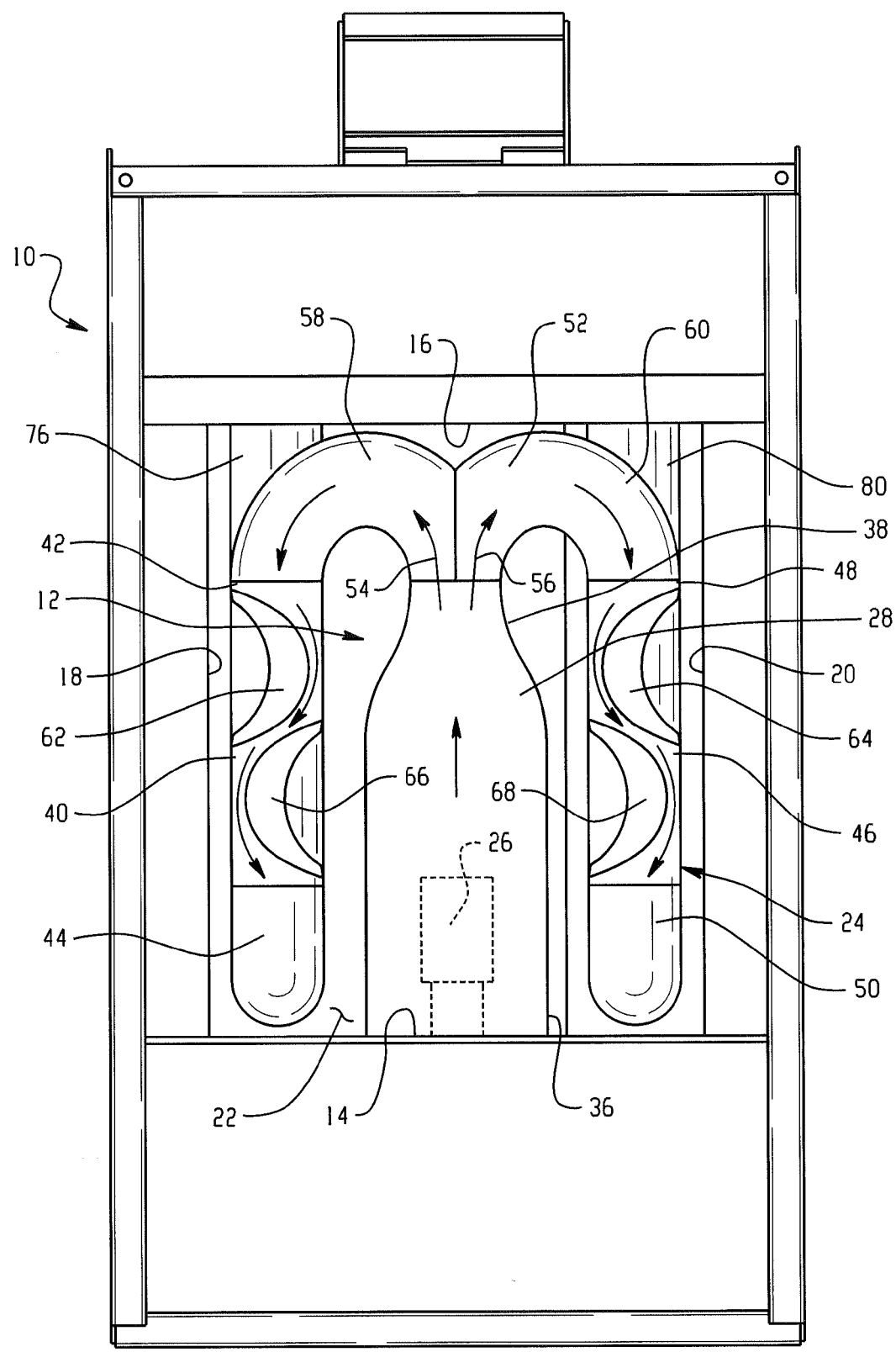
FIG. 2 is a top view of the fryer of FIG. 1.

Referring to FIGS. 1 and 2, a fryer apparatus 10 is shown and includes an open-top vat 12 having front 14, rear 16, left 18, right 20 and bottom 22 side wall portions. The vat side walls may, for example, be formed of stainless steel or aluminum sheet metal that is formed and welded. A typical volume for the vat may be between about 5 to 11 gallons (e.g, typically about 40 to 90 pounds of oil). A heat exchange system is associated with the fryer vat for heating oil within the fryer vat. The heat exchange system includes an immersed heat exchange tube 24 and associated gaseous fuel burner 26 that is shown in dashed line form. The illustrated burner is located at least partially within an initial pass 28 of the heat exchange tube and may, by way of example, be a mesh-type burner. However, burner arrangements that are disposed external of the heat exchange tube are also contemplated. As shown in FIG. 1, the front side of the fryer includes an opening 30 and associated mount structure 32 for mounting the gaseous fuel burner in place, along with a drain tube 34 for draining oil from the vat 12.

As shown in FIG. 1, the fryer housing structure to which the vat is attached may include edge portions extending upward from the right and left sides of the vat, a front portion extending laterally forward of the front of the vat to an upwardly extending front edge portion, and a back portion extending laterally rearward of the rear portion of the vat to an upwardly extending rear wall, where the rear wall extends upward to a height well beyond the height of the left, right and front edge portions. Additional housing structure and/or support frame structure may be associated with the bottom portion of the fryer vat as well.

Figure 3:
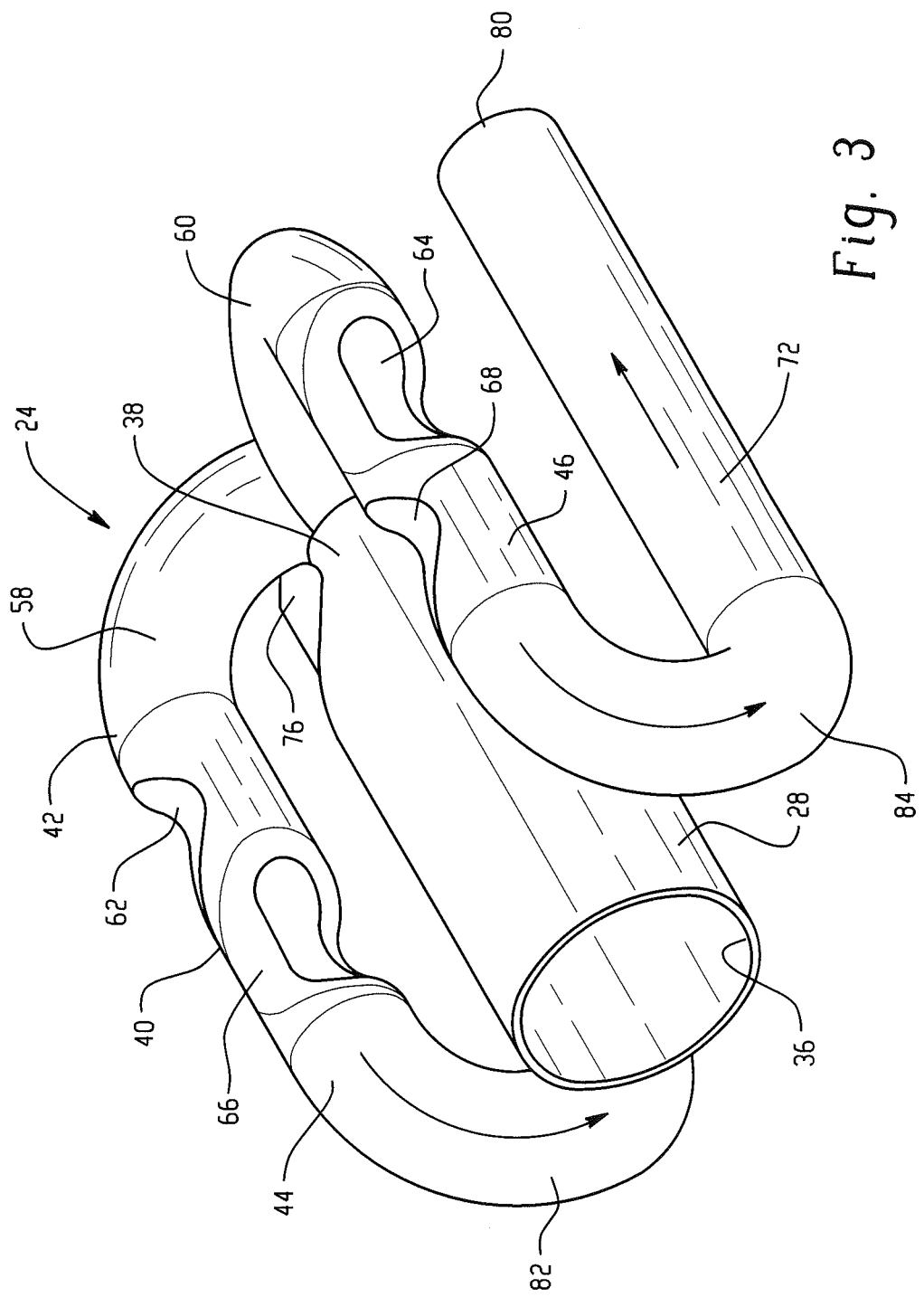
FIG. 3 is a perspective view of a fryer heat exchange tube.

Referring to FIGS. 2 and 3, the heat exchange tube arrangement includes the initial pass 28 (front to rear) having an inlet end and 36 and an outlet end 38, with the inlet end located toward the front side of the fryer vat and the outlet end located toward the rear side of the fryer vat. A left second pass 40 (rear to front) of the heat exchange tube is located within the vat 12 between the left side of the fryer vat and the initial or first pass 28. The left second pass has an inlet end 42 positioned toward the rear side of the fryer vat and an outlet end 44 located toward the front side of the fryer vat. A right second pass 46 (rear to front) of the heat exchange tube is located within the vat between the right side of the fryer vat and the first pass 28. The right second pass 46 has an inlet end 48 positioned toward the rear side of the fryer vat and an outlet end 50 located toward the front side of the fryer vat. The inlet ends 42 and 48 each receive hot, combusted gases from the outlet end 38 of the first pass. In this regard, a pass connecting tube segment 52 is arranged for delivering the hot gases from the first pass 28 to each of the second passes 40 and 46 by splitting hot gas flow from the first pass into two distinct flow paths 54 and 56. In the illustrated embodiment the pass connecting segment 52 is generally m-shaped in configuration (when viewed from the top or bottom) with a curved section 58 providing flow to the left second pass 40 and a curved section 60 providing flow to the right second pass 46.

Both the left second pass 40 and the right second pass 46 include first 62, 64 and second 66, 68 depressed sections there along. The depressed sections may be created by deforming portions of the tubular sidewall inward. Depressed sections 66 and 68 are located downstream of, and on opposite tube sides of, the depressed section sections 62 and 64. The depressed sections disrupt air flow along the tube to produce a more turbulent flow for better heat exchange with the tube side wall, and temporarily reduce the flow are along the tube (e.g, reducing the flow area by between about 30 and 50 percent, such as about 35 to 45 percent).

Figure 4:
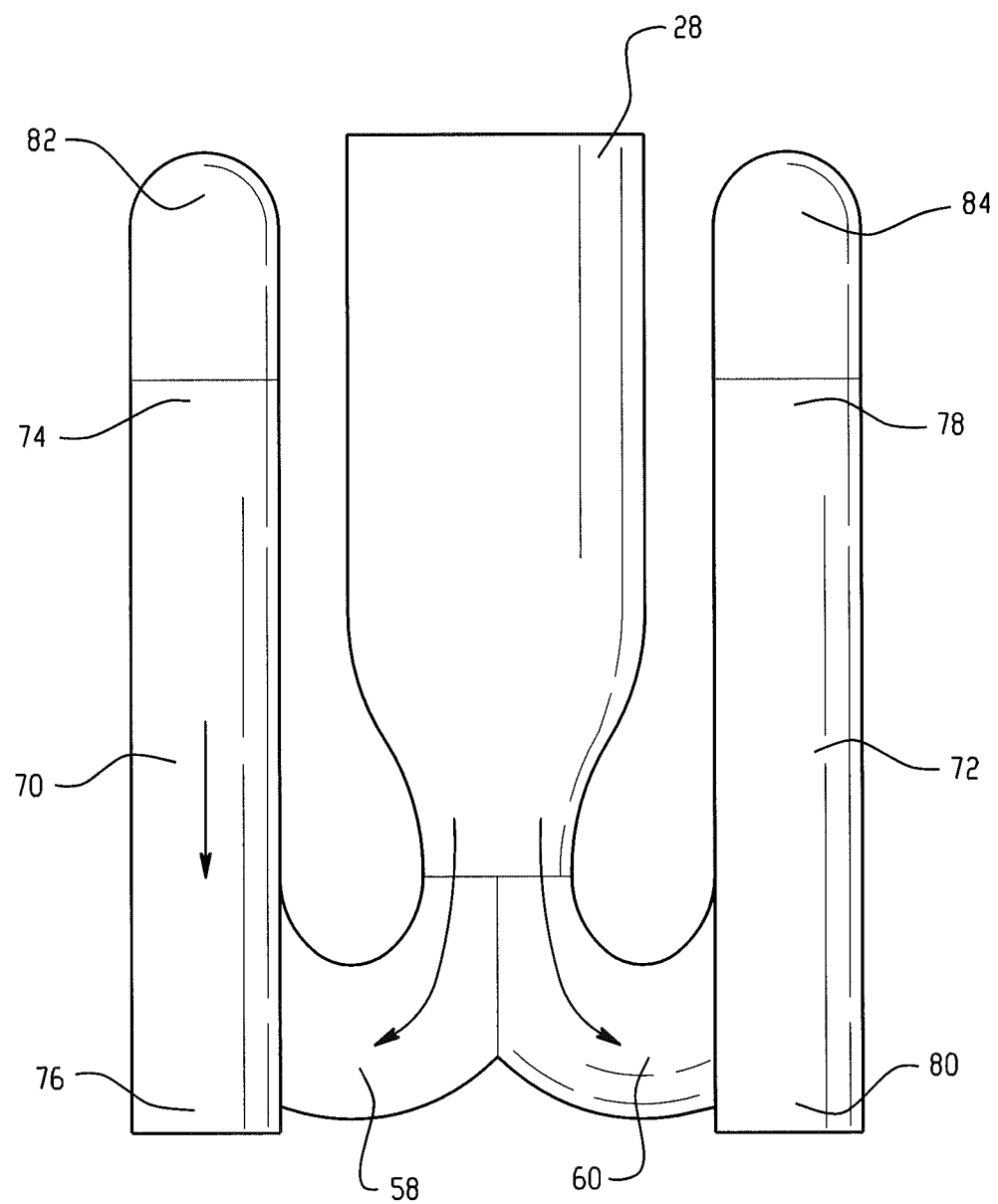
FIG. 4 is a bottom view of the heat exchange tube of FIG. 3.

As best seen in FIG. 3 and the bottom view of FIG. 4, the heat exchange tube 24 also includes a left third pass 70 (front to rear) and a right third pass 72 (front to rear) located within the vat and below respective passes 40 and 46. Pass 70 has an inlet end 74 positioned toward the front side of the fryer vat and an outlet end 76 located toward the rear side of the fryer vat and pass 72 has an inlet end 78 positioned toward the front side of the fryer vat and an outlet end 80 located toward the rear side of the fryer vat. The inlet end of each pass 70 and 72 is connected to receive hot gases from the outlet end of the respective pass 40 and 46 via respective curved tube segments 82 and 84. In this regard, the heat exchange tube may be produced by forming multiple tube segments (e.g., of stainless steel) and then welding the various segments together into the final configuration. In one implementation, the initial pass 26 may have a primary, largest diameter of between about 3 to 5 inches (e.g., about 4 inches), and the downstream tube passes may have primary, largest diameters of about half that, or between about 1.5 and 2.5 inches (e.g., about 2 inches).

Figure 5:
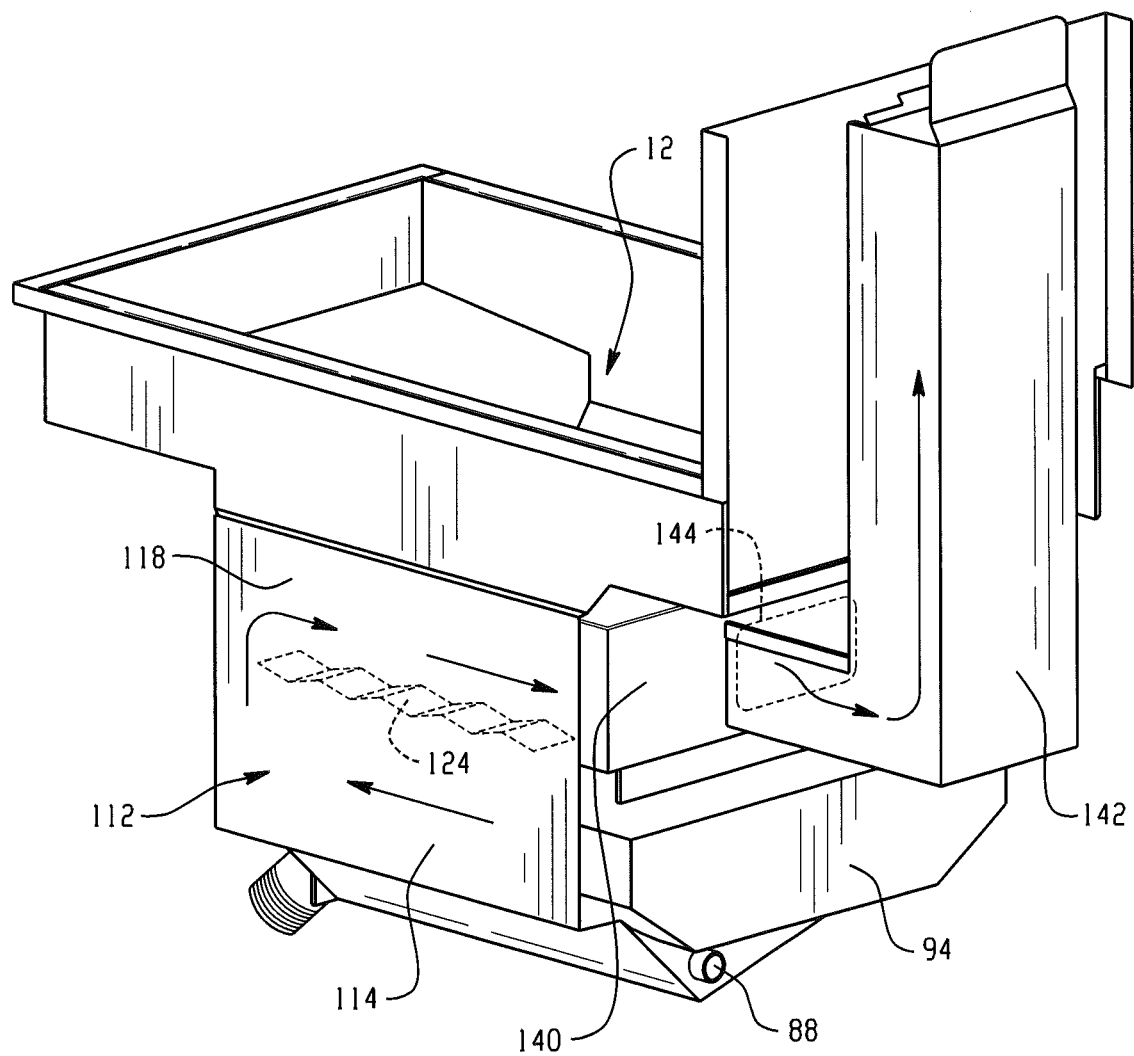
FIGS. 5 and 6 are rear perspective views of the fryer of FIG. 1.
Figure 6:
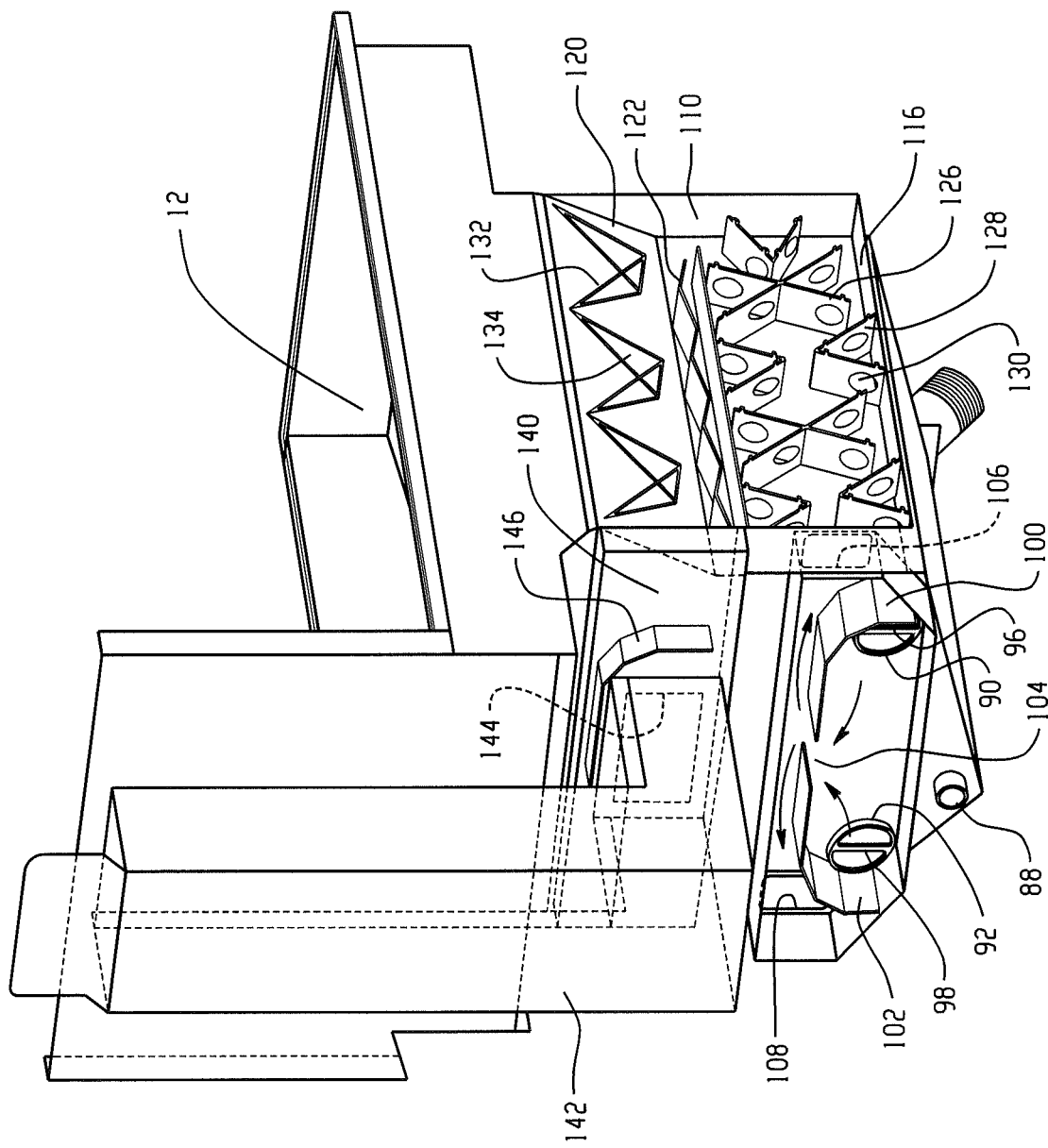

The heat exchange tube 24 may be secured to the fryer vat 12 by welding the inlet end 36 of pass 38 to the opening 30 in the front side wall of the vat and welding the outlet ends 76 and 80 of third passes 70 and 72 to respective openings in the rear side wall of the vat. In this regard, reference is made to FIGS. 5 and 6 showing rear perspective views of the fryer, with FIG. 6 providing a view with external panels of the ductwork removed. An oil recirculation input port 88 to the vat is shown in these views, which may be provided in embodiments where oil can be drained from the vat, filtered and then recirculated back to the vat.

As shown, the third passes 70 and 72 exit the vat through vat rear side wall openings 90 and 92 respectively and dump into a common, lower manifold duct 94 that extends laterally along the rear side wall of the vat. Baffles 96 and 98 in the tubular passes 70 and 72 are also shown, and may be formed by elongated metallic strips with flaps of metal extending there from. The duct 94 includes directional flow panels 100 and 102 that move the incoming gases toward a center portion of the duct, where the gases move upward between a space 104 between the panels 100 and 102. The gases then move laterally left and right along the duct 94 toward exit openings 106 and 108 that lead to ducts 110 and 112 located along the side portions of the vat.

Each side duct includes a respective lower section 114 and 116 forming a rear to front pass along the external surface of the vat sidewall and a respective upper section 118 and 120 forming a rear to front pass along the external surface of the vat sidewall, with an internal flow panel 122 and 124 located therebetween. Baffling structure is located along each section of the ducts for increasing flow turbulence to enhance heat transfer to the vat side walls. In the illustrated embodiment the baffling structure located along lower sections 114 and 116 is formed by X-shaped 126 and/or V-shaped 128 panels that have their large surface areas facing to obstruct flow along the sections, but with openings 130 provided in the panels so as to avoid excessive flow obstruction. The baffling structure located in the upper sections 118 and 120 is formed by generally V-shaped members 132 with triangular openings 134. However, it is recognized that the exact configuration of the baffling structure could vary widely. The duct width in the upper sections 118 and 120 narrows when moving upward due to the outward taper of the vat sidewall in this region.

In order to further enhance heat transfer to the vat sidewalls, the baffling structure may be configured and mounted in an effective heat exchange relationship with the external surface of the vat side wall, as by providing good surface to surface contact between the baffling structure and the external surface and/or by welding the baffling structure to the external surface. Moreover, heat loss to the exterior of the oven may be limited by providing a less effective heat transfer relationship with the internal surfaces of the external duct panels, as by small stand-off protrusions at the exterior side of the baffling structure to limit the contact of the baffling structure with the external duct walls. For example, a contact area between the baffling structure and the internal surface of the exterior duct wall structure may be no more than about ten percent, or more preferably less than about five percent, of a contact area between the baffling structure and the external surface of the vat sidewall.

The downstream ends of the upper sections 116 and 118 of the side wall ducts deliver hot gases into a common, upper manifold duct 140 that connects with an exhaust stack 142 of the fryer via a duct opening 144. A flow disruption panel 146 may be located about the upper side portions of the opening 144, again for disrupting flow and increasing heat transfer to the rear wall of the vat.

Figure 7:
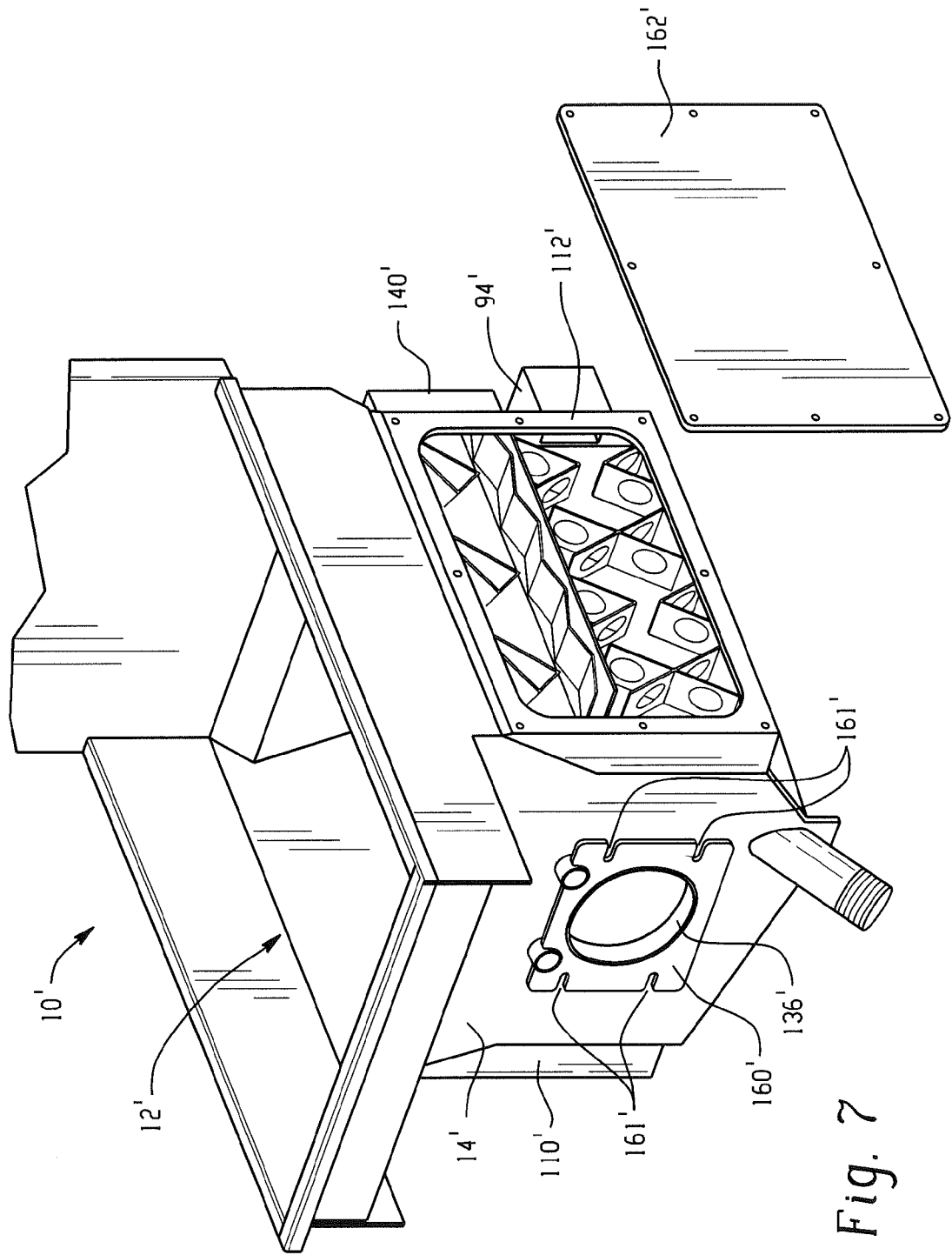
FIGS. 7 and 8 show front and rear perspective views of an alternative embodiment of a fryer.
Figure 8:
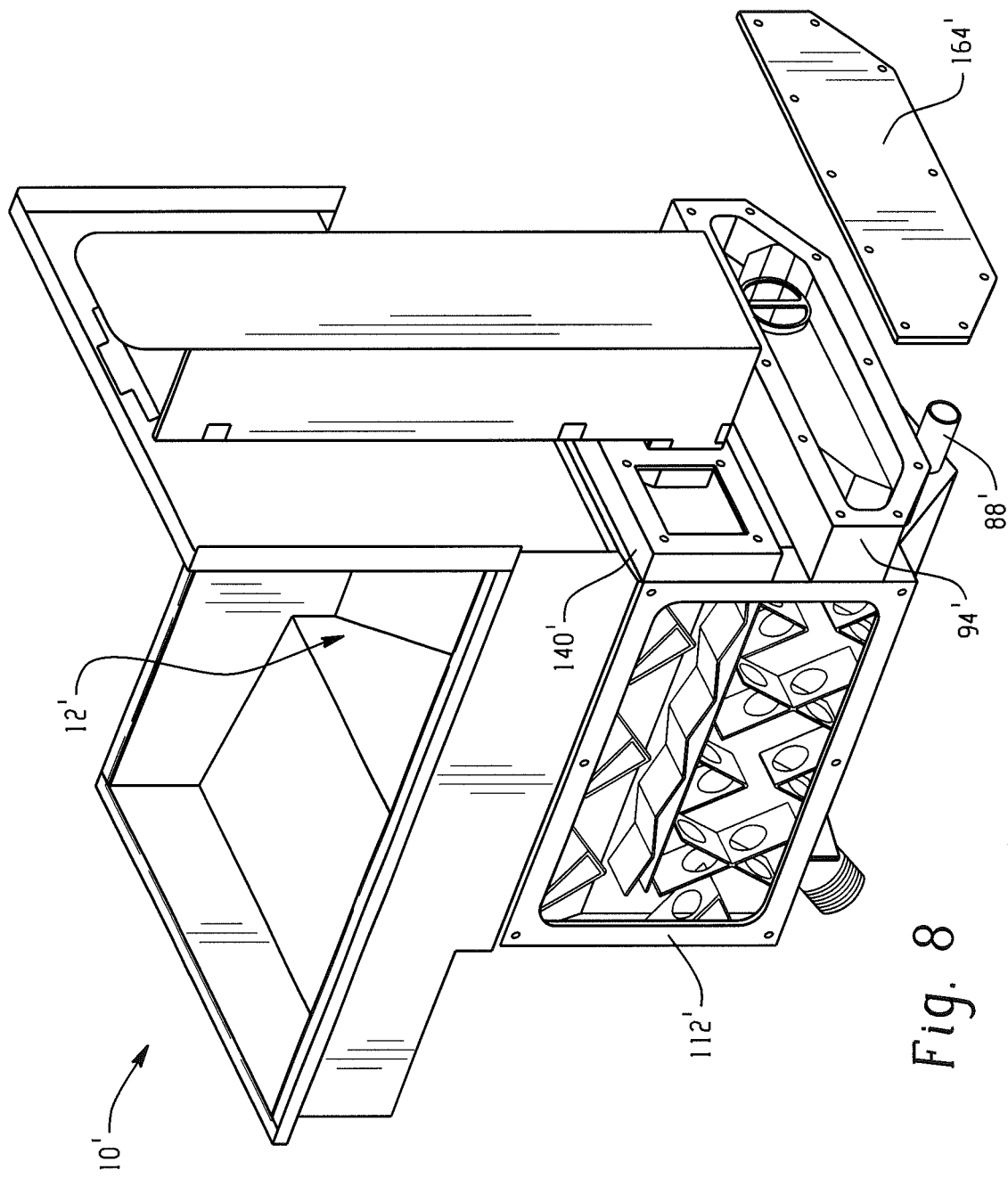

Referring to FIGS. 7 and 8, an alternative fryer embodiment 10' is shown, which includes many of the same structural features as fryer 10, including the same heat exchange tube configuration (not shown) and same external duct flow arrangement at the sides and rear. However, the front wall 14' of the fryer vat 12' of fryer 10' includes a mounting plate structure 160'. In this arrangement, the first past of the heat exchange tube is positioned within the vat and is welded to the interior side of the front wall 14' of the fryer vat with the inlet end 136' of the heat exchange tube protruding slightly forward of the exterior side of the front wall 14'. The mounting plate 160' is welded to the protruding end of the heat exchange tube such that the mounting plate 160' is arranged parallel to, but slightly offset from the exterior side of the front wall 14'. The mounting plate 160' includes slots 161' formed therein to receive fasteners (e.g., screw and nut assemblies) that are used to secure the burner assembly to the mounting plate. In this regard, the burner assembly may include a burner attached to a corresponding mounting plate (not shown). The fasteners are used to hold the burner assembly mounting plate against the mounting plate 160'. In addition the side ducts 110' and 112' are provided with removable covers (e.g., per cover 162') for ease of access to the ducts if needed. Rear ducts 94' and 140' are also provided with removable covers (e.g., per cover 164' for duct 94'). Suitable fasteners may be used to secure the covers in place. Input port 88' is also slightly larger than the comparable input port of fryer 10.

It is to be clearly understood that the above description is intended by way of illustration and example only, is not intended to be taken by way of limitation, and that other changes and modifications are possible.

What is claimed is:

1. A heating system, comprising:
   a tank having a bottom side, a front side, a rear side, a left side and a right side;
   a heat exchange system associated with the tank and including a heat exchange tube arrangement with an associated gaseous fuel burner, the heat exchange tube arrangement including:
      a first pass within the tank and having an inlet end and an outlet end, the inlet end located toward the front side of the tank, the outlet end located toward the rear side of the tank;
      a left second pass within the tank and located between the left side of the tank and the first pass, the left second pass having an inlet end positioned toward the rear side of the tank and an outlet end located toward the front side of the tank, the inlet end of the left second pass connected to receive hot gases from the outlet end of the first pass;
      a right second pass within the tank and located between the right side of the tank and the first pass, the right second pass having an inlet end positioned toward the rear side of the tank and an outlet end located toward the front side of the tank, the inlet end of the right second pass connected to receive hot gases from the outlet end of the first pass;
      a left third pass located within the tank, the left third pass having an inlet end positioned toward the front side of the tank and an outlet end located toward the rear side of the tank, the inlet end of the left third pass connected to receive hot gases from the outlet end of the left second pass, the left third pass and left second pass are spaced apart vertically between a top of the tank and the bottom side of the tank;
      a right third pass located within the tank, the right third pass having an inlet end positioned toward the front side of the tank and an outlet end located toward the rear side of the tank, the inlet end of the right third pass connected to receive hot gases from the outlet end of the right second pass, the right third pass and right second pass are spaced apart vertically between the top of the tank and the bottom side of the tank.

2. The heating system of claim 1 wherein the heat exchange tube arrangement includes a pass connecting segment for delivering hot gases from the first pass to each of the left second pass and the right second pass, the pass connecting segment splitting hot gas flow from the first pass into two distinct flow paths that respectively feed the left second pass and the right second pass.

3. The heating system of claim 2 wherein the pass connecting segment is generally m-shaped with a first curved section providing flow to the left second pass and a second curved section providing flow to the right second pass.

4. The heating system of claim 1 wherein:
   the first pass, left second pass and right second pass are of tubular configuration, the left second pass includes at least one depressed section there along having reduced flow area, and the right second pass includes at least one depressed section there along having reduced flow area.

5. The heating system of claim 4 wherein:
   the left second pass includes first and second depressed sections there along, the second depressed section downstream of the first depressed section, the first depressed section formed on one side of the left second pass and the second depressed section formed on an opposite side of the left second pass;
   the right second pass includes first and second depressed sections there along, the second depressed section downstream of the first depressed section, the first depressed section formed on one side of the right second pass and the second depressed section formed on an opposite side of the right second pass.

6. The heating system of claim 1, wherein:
   the outlet end of the left third pass is connected to deliver at least some hot gases to a first duct flow path formed in part by an external surface of the left side of the tank;
   the outlet end of the right third pass is connected to deliver at least some hot gases to a second duct flow path formed in part by an external surface of the right side of the tank.

7. A heating system, comprising:
   a tank having a front side, a rear side, a left side and a right side;
   a heat exchange system associated with the tank and including a heat exchange tube arrangement with an associated gaseous fuel burner,
   the heat exchange tube arrangement formed by a heat exchange tube positioned within the tank and including:
      a first front to rear pass within the tank and having an inlet end and an outlet end, the inlet end located toward the front side of the tank, the outlet end located toward the rear side of the tank;
      a first rear to front pass within the tank and having an inlet end positioned toward the rear side of the tank and an outlet end located toward the front side of the tank, the inlet end of the first rear to front pass connected to receive hot gases from the outlet end of the first front to rear pass;
      a second rear to front pass within the tank and having an inlet end positioned toward the rear side of the tank and an outlet end located toward the front side of the tank, the inlet end of the second rear to front pass connected to receive hot gases from the outlet end of the first front to rear pass;

the heat exchange system further including ducting external of the tank that receives gases from the heat exchange tube, the ducting including:

a left rear to front duct pass and a left front to rear duct pass located externally of the tank and alongside an exterior surface of the left side of the tank, the left rear to front duct pass and left front to rear duct pass located downstream of the first rear to front pass of the heat exchange tube;

a right rear to front duct pass and a right front to rear duct pass located externally of the tank and alongside an exterior surface of the right side of the tank, the right rear to front duct pass and right front to rear duct pass located downstream of the second rear to front pass of the heat exchange tube.

8. A heating system, comprising:

a submerged heat exchange tube arrangement having:

a first pass having an inlet end and an outlet end;

a left second pass having an inlet end positioned toward the outlet end of the first pass and an outlet end located toward the inlet end of the first pass, the inlet end of the left second pass connected to receive hot gases from the outlet end of the first pass;

a right second pass having an inlet end positioned toward the outlet end of the first pass and an outlet end located toward the inlet end of the first pass, the inlet end of the right second pass connected to receive hot gases from the outlet end of the first pass;

a left third pass having an inlet end positioned toward the outlet end of the left second pass and an outlet end positioned toward the inlet end of the left second pass, the inlet end of the left third pass connected to receive hot gases from the outlet end of the left second pass, the left third pass positioned below the left second pass;

a right third pass having an inlet end positioned toward the outlet end of the right second pass and an outlet end positioned toward the inlet end of the right second pass, the inlet end of the right third pass connected to receive hot gases from the outlet end of the right second pass, the right third pass positioned below the right second pass.

9. The heating system of claim 8 wherein a pass connecting tube segment delivers hot gases from the first pass to each of the left second pass and the right second pass, the pass connecting tube segment splitting hot gas flow from the first pass into two distinct flow paths the respectively feed the left second pass and the right second pass.

10. The heating system of claim 8 wherein the left second pass includes at least one depressed section there along having reduced flow area, and the right second pass includes at least one depressed section there along having reduced flow area.

11. The heating system of claim 8 wherein:

the left second pass includes first and second depressed sections there along, the second depressed section downstream of the first depressed section, the first depressed section formed on one side of the left second pas and the second depressed section formed on an opposite side of the left second pass;

the right second pass includes first and second depressed sections there along, the second depressed section downstream of the first depressed section, the first depressed section formed on one side of the right second pas and the second depressed section formed on an opposite side of the right second pass.

* * * * *